United States Patent [19]

Janosik

[11] Patent Number: 5,428,313
[45] Date of Patent: Jun. 27, 1995

[54] CLOSED LOOP PRESSURE TRANSDUCER WITH IMPROVED START-UP SETTLING

[75] Inventor: Michael C. Janosik, Granger, Ind.

[73] Assignee: AlliedSignal Inc., Morristown, N.J.

[21] Appl. No.: 132,729

[22] Filed: Oct. 6, 1993

[51] Int. Cl.⁶ .......................... G06G 7/12; H04B 1/10
[52] U.S. Cl. .................... 327/362; 327/553; 327/170
[58] Field of Search .............. 307/491, 521, 263; 327/362, 553, 170

[56] References Cited

U.S. PATENT DOCUMENTS 5,166,630 11/1992 Lee ........................................ 307/491
5,329,191 7/1994 Korhonen et al. ................... 307/491

FOREIGN PATENT DOCUMENTS 0130224 10/1980 Japan ..................... 307/491

Primary Examiner—Margaret Rose Wambach
Attorney, Agent, or Firm—Leo H. McCormick, Jr.; Larry J. Palguta

[57] ABSTRACT

Improvements in closed loop feedback circuit of the type having both digital circuitry and analog loop compensation circuitry comprising an analog arrangement for temporarily reducing the analog loop compensation circuitry gain, and a digital arrangement operable upon circuit initialization (reset or initial energization) to actuate the analog arrangement for a predetermined time interval to avoid overshoot and reduce the time required to achieve stable loop operation. The loop compensation circuitry typically includes at least one capacitor and the analog arrangement for temporarily reducing the gain may include a resistive shunt temporarily connected in parallel with the capacitor. In one preferred embodiment, there is a resistor connected in series with the resistive shunt by the controlled conduction path of a semiconductor device such as a field effect transistor having its conduction path and its internal resistive shunt connected in parallel with the capacitor.

12 Claims, 2 Drawing Sheets

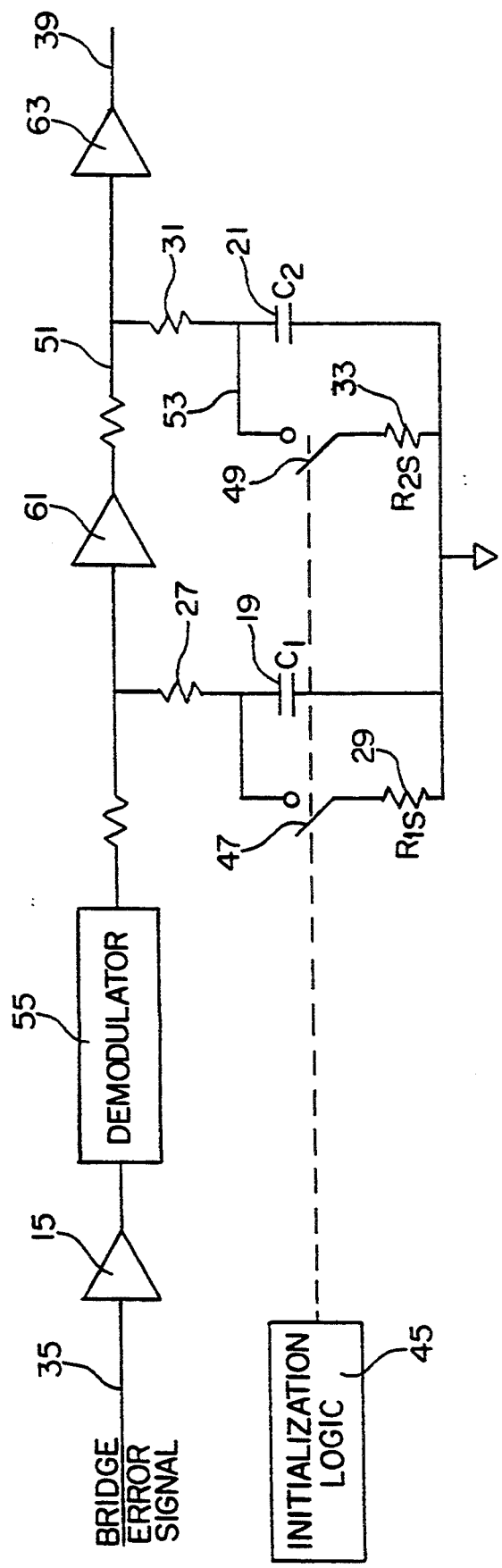

CLOSED LOOP PRESSURE TRANSDUCER WITH IMPROVED START-UP SETTLING

SUMMARY OF THE INVENTION

The present invention relates generally to closed loop feedback circuits and more particularly to improvements in such circuits which speed settling (reduce the initial transient response) upon initial energization or reset of such circuits.

In an illustrative closed loop pressure transducer circuit, there is an analog compensation circuit having several amplifiers with one amplifier output functioning to charge a capacitor and with the charge on that capacitor providing the predominant input for a second amplifier. Upon initial energization, the first amplifier output is at or near saturation resulting in the rapid buildup of a significant charge on the capacitor. The subsequent dissipation of part of this charge allowing the system to settle in requires a significant length of time.

Among the several objects of the present invention may be noted the reduction of the time required for a system of the above type to settle in and the provision of an improved closed loop pressure transducer circuit.

The present invention achieves the forgoing objects by temporarily connecting a resistive shunt in parallel with the capacitor thereby temporarily reducing the loop forward gain and time constant of the analog compensation circuitry upon circuit initialization to avoid overshoot and reduce the time required to achieve stable loop operation. In the event there are more than two amplifiers in the compensation circuitry, and therefor also more than one capacitor, each capacitor may be treated similarly.

In general, and in the environment of a closed loop feedback circuit having loop compensation circuitry with at least one capacitor, a voltage divider circuit has a voltage input and a reduced voltage output. The capacitor is temporarily coupled to the voltage divider circuit output upon the occurrence of a reset signal or upon initial circuit energization to prevent an excessive charge buildup thereon.

Also in general and in one form of the invention, a closed loop feedback circuit having high gain loop compensation circuitry includes an arrangement for temporarily reducing the compensation circuitry loop forward gain upon circuit initialization to avoid overshoot and reduce the time required to achieve stable loop operation. The high gain loop compensation circuitry includes at least one capacitor, and the arrangement for temporarily reducing the gain includes a resistive shunt which is temporarily connected in parallel with the capacitor.

BRIEF DESCRIPTION OF THE DRAWING

FIG. 2 is a schematic diagram illustrating a modification to the circuit of FIG. 1 in accordance with the present invention.

Corresponding reference characters indicate corresponding parts throughout the several views of the drawing.

DESCRIPTION OF THE PREFERRED EMBODIMENT

Figure 1:
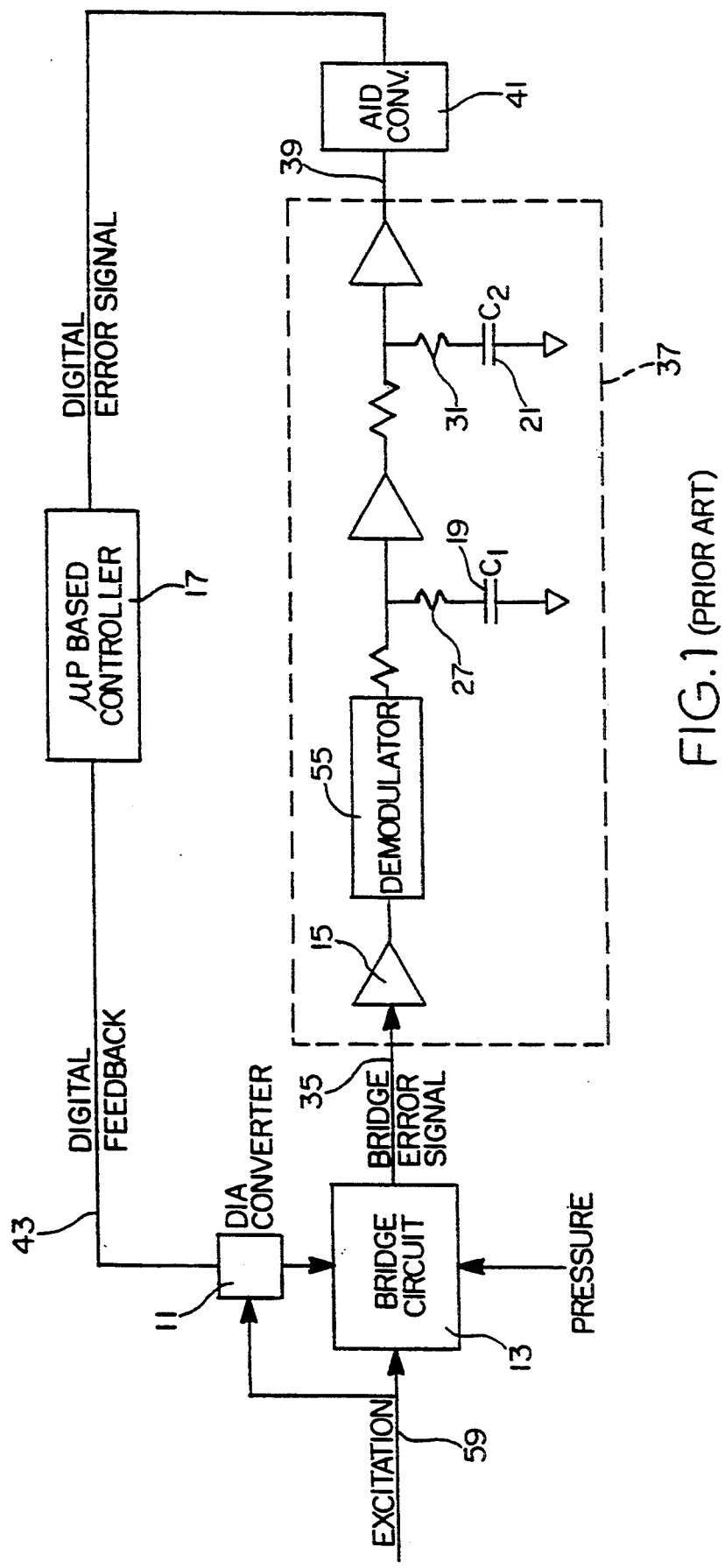
FIG. 1 is a schematic diagram of a prior art closed loop pressure transducer circuit.

FIG. 1 illustrates a conventional closed loop pressure transducer circuit having both digital and analog components. This circuit operates as more fully described in the above mentioned U.S. Pat. No. 4,449,409. The system is essentially a high gain servo loop utilizing hardware lead-lag compensation to maintain proper phase and gain margin over the operating range. The closed loop pressure transducer circuit includes a pressure transducer bridge circuit 13 which may, for example, be a pressure sensitive capacitance bridge, and may be excited by a 10 kilohertz signal on line 59. The bridge has an analog error signal output on line 35 which is supplied to a high gain analog loop compensation circuit 37 which responds to the analog error signal and provides a modified analog error signal on line 39. The bridge error signal on line 35 is an alternating current signal, but demodulator 55 converts this to a direct current error signal, thus, the modified analog error on line 39 is a direct current signal. An analog to digital converter 41 converts the modified analog error signal on line 39 to a digital error signal which is then digitally processed by the controller 17. A digital to analog converter 11 then converts the processed digital error signal on line 43 to an analog signal which is supplied to the bridge circuit 13. Normal operation of this circuit is more completely described in U.S. Pat. No. 4,449,409. Briefly, the circuit strives for a null on line 39 by modifying the state of the digital to analog converter 11. The state of the digital to analog converter 11 is indicative of the pressure being monitored.

During initialization of this system, the state of the digital to analog converter 11 is indeterminate. This will typically produce a large imbalance in the pressure sensitive bridge circuit 13 and a correspondingly high, or saturated, output from amplifier 15. During the time the microprocessor based controller 17 is initializing itself, the high output level from the amplifier 15 causes the loop compensation capacitors 19 and 21 to store a significant charge. This charge must then be overcome when the controller 17 begins closing the loop, and results in an excessive settling time.

FIG. 2 illustrates an initialization arrangement for lowering the gain of the loop compensation circuit 37 for a predetermined time after a reset event such as initial circuit energization or upon the occurrence of a system reset signal. FIG. 2 shows that portion of FIG. 1 enclosed within dotted lines 37 modified according to the present invention. FIG. 2 differs from FIG. 1 by the addition of initialization logic 45, resistors 29 and 33, and a pair of switches 47 and 49 under the control of the initialization logic. While switches 47 and 49 are shown for simplicity, it will be understood that field effect or other transistors as well as other components that provide a switching function may be employed. The capacitor 19 is initially uncharged and the switch 47 is closed upon initial circuit energization so that during initial circuit start-up, the charge which is accumulated on the capacitor 19 builds up at a rate determined by the voltage divider circuit formed by resistors 29 and 27. There is a second capacitor 21 in the loop compensation circuitry and a second voltage divider circuit formed of the resistors 31 and 33 with a voltage input between line 51 and ground, and a reduced voltage output between line 53 and ground which is applied to the capacitor. The capacitor 21 is temporarily coupled to this second voltage divider output while the switch 49 is closed. The second capacitor, like the first, is initially uncharged and the switch 49 is enabled (closed) upon initial circuit start-up, a charge is accumulated on the second capacitor at a rate determined by the second voltage divider circuit. Switches 47 and 49 may also be closed by the initialization logic 45 upon the occurrence of a reset signal so that during subsequent initialization of the circuit, the charge on the capacitors is controlled by the voltage divider circuits.

Closure of switch 47, for example, upon the occurrence of a reset event introduces resistor 29 as a resistive shunt temporarily connected in parallel with the capacitor 19 so that during subsequent initialization of the circuit, the charge on the capacitor is limited by the resistive shunt. This temporarily reduces the compensation circuitry loop forward gain thereby avoiding overshoot and reducing the time required to achieve stable loop operation.

In one implementation of the circuit, switches 47 and 49 function as a means for temporarily coupling the capacitors to their respective voltage divider circuits have been replaced by a pair of field effect transistors in which each transistor has a control terminal or electrode and a controlled conduction path. In this configuration, the control terminal is a gate and the source-drain path functions as a controlled conduction path. The internal resistance of the field effect transistor also provides the resistance 29 or 33. In one preferred form, resistor 27 was about 182 k ohms, resistor 31 was about 75 k ohms and the source-drain conduction path of the field effect transistors (resistors 29 and 33) was about 30 k ohms each.

Implementations using other semiconductor devices such as conventional transistors having bases as control terminals and collector-emitter conduction paths should now be readily apparent. In such an implementation, a voltage divider circuit would includes first 27 and second 29 resistors connected in series by the collector-emitter circuit of the transistor, the transistor collector-emitter circuit and second resistor 29 being connected in parallel with the capacitor 19.

The operation of the circuit of the invention should now be clear since the prior art capacitor charging problem which can occur upon initialization of a feedback circuit has been alleviated by bypassing the capacitors with a pair of transistors during the controller initialization phase. Upon application of power or the receipt of a hardwired reset, the initialization logic activates the bypass circuitry by closing switches 47 and 49 to prevent excess charging of capacitors 19 and 21. In addition, the forward gain of the circuit is reduced through the formation of the resistive dividers 27, 29, and 31, 33. Through proper selection of resistors 29 and 33, proper gain and phase margin are maintained in this start-up configuration. In addition, the time constant of the system is reduced through the resistive shunting of resistors 29 and 33. This configuration allows the controller 17 to perform a coarse null of the system for a predetermined time period after which the bypass circuitry is released allowing the system to run with full system gain.

What is claimed is:

1. In a closed loop feedback circuit having loop compensation circuitry including at least one capacitor, the improvement comprising a voltage divider circuit having a voltage input and a reduced voltage output, and means for temporarily coupling the capacitor to the voltage divider circuit output to prevent an excessive charge buildup thereon a semiconductor having a control electrode and a controlled conduction path, and the voltage divider circuit includes first and second resistors connected in series by the controlled conduction path of the semiconductor, the controlled conduction path and second resistor being connected in parallel with the capacitor, said capacitor initially being uncharged and the means for temporarily coupling is enabled upon initial circuit energization so that during initial circuit start-up, a charge is accumulated on the capacitor at a rate determined by the voltage divider circuit.

2. The improvement of claim 1 wherein there is a second capacitor in the loop compensation circuitry, the improvement further comprising a second voltage divider circuit having a second voltage input and a second reduced voltage output, and second means for temporarily coupling the second capacitor to the second voltage divider output.

3. The improvement of claim 2 wherein the second capacitor is initially uncharged and the second means for temporarily coupling is enabled upon initial circuit energization so that during initial circuit start-up, a charge is accumulated on the second capacitor at a rate determined by the second voltage divider circuit.

4. The improvement of claim 1 wherein the means for temporarily coupling is enabled upon the occurrence of a reset signal so that during subsequent initialization of the circuit, the charge on the capacitor is controlled by the voltage divider circuit.

5. In a closed loop feedback circuit having high gain loop compensation circuitry includes at least on capacitor, the improvement comprising means for temporarily reducing the compensation circuitry loop forward gain upon circuit initialization to avoid overshoot and reduce the time required to achieve stable loop operation having a resistive shunt temporarily connected in parallel with the capacitor, said means for temporarily reducing means including a semiconductor having a control electrode, a controlled conduction path and a resistor connected in series with the resistive shunt by the controlled conduction path, the controlled conduction path and resistive shunt being connected in parallel with the capacitor, said capacitor initially being uncharged such that during initial circuit start-up the means for temporarily reducing is enabled upon energization so that, a charge is accumulated on the capacitor at a rate determined by the resistive shunt.

6. The improvement of claim 5 wherein the means for temporarily reducing is enabled upon the occurrence of a reset event so that during subsequent initialization of the circuit, the charge on the capacitor is limited by the resistive shunt.

7. A closed loop pressure transducer circuit for temporarily reducing the forward gain to avoid overshoot and reduce the time required to achieve stable loop operation comprising a pressure transducer bridge circuit having an analog error signal output, a high gain loop compensation circuit responsive to said analog error signal for creating a modified analog error signal, initialization means responsive to an initial operational input for lowering the gain of the loop compensation circuit for a predetermined time after a reset event, an analog to digital converter for receiving said modified analog error signal and converting said modified analog error signal to a digital error signal, means connected to receive said digital error signal and for digitally processing said digital error signal, a digital to analog converter for converting the processed digital error signal to an analog signal, and means supplying the analog signal to the bridge circuit for nullifying said modified analog error signal.

8. The improvement of claim 7 wherein the high gain loop compensation circuitry includes at least one capacitor, and the initialization means includes a resistive shunt temporarily connected in parallel with the capacitor.

9. The improvement of claim 8 wherein initialization means is enabled upon the occurrence of a reset signal so that during subsequent initialization of the circuit, the charge on the capacitor is limited by the resistive shunt.

10. The improvement of claim 8 wherein the capacitor is initially uncharged and the initialization means is enabled upon initial circuit energization so that during initial circuit start-up, a charge is accumulated on the capacitor at a rate determined by the resistive shunt.

11. In a closed loop feedback circuit having both digital circuitry and analog loop compensation circuitry, the improvement comprising analog means for temporarily reducing the analog loop compensation circuitry gain and time constant, and digital means operable upon circuit initialization to actuate the analog means only for a predetermined time interval to avoid overshoot and reduce the time required to achieve stable loop operation.

12. The improvement of claim 11 wherein the loop compensation circuitry includes at least one capacitor, and the means for temporarily reducing includes a resistive shunt temporarily connected in parallel with the capacitor.

* * * * *